US010853192B2

(12) United States Patent
Sorenson (10) Patent No.: US 10,853,192 B2
(45) Date of Patent: Dec. 1, 2020

(54) DATABASE REPLICATION WITH CONTINUE AND TAPE-TYPE-OVERRIDE FUNCTIONS

(71) Applicant: Ellen L Sorenson, Mounds View, MN (US)

(72) Inventor: Ellen L Sorenson, Mounds View, MN (US)

(73) Assignee: Unisys Corporation, Blue Bell, PA (US)

( * ) Notice: Subject to any disclaimer, the term of this patent is extended or adjusted under 35 U.S.C. 154(b) by 290 days.

(21) Appl. No.: 14/629,915

(22) Filed: Feb. 24, 2015

(65) Prior Publication Data
US 2016/0246520 A1    Aug. 25, 2016

(51) Int. Cl.
G06F 11/14    (2006.01)
G06F 11/00    (2006.01)

(52) U.S. Cl.
CPC .......... *G06F 11/1469* (2013.01); *G06F 11/00* (2013.01); *G06F 11/1435* (2013.01); *G06F 11/1451* (2013.01); *G06F 2201/80* (2013.01); *G06F 2201/84* (2013.01)

(58) Field of Classification Search
CPC .... G06F 11/1435; G06F 3/0619; G06F 3/065; G06F 11/1451; G06F 11/1469
See application file for complete search history.

(56) References Cited

U.S. PATENT DOCUMENTS

| 6,324,548 B1* | 11/2001 | Sorenson | G06F 11/1469 707/648 |
|---|---|---|---|
| 8,924,355 B1* | 12/2014 | Kundzich | G06F 11/1458 707/647 |
| 9,372,761 B1* | 6/2016 | Chai | G06F 11/1458 |
| 2005/0044088 A1* | 2/2005 | Lindsay | G06F 17/30578 |
| 2006/0235847 A1* | 10/2006 | Farlee | G06F 11/1466 |
| 2010/0114817 A1* | 5/2010 | Broeder | G06F 11/2094 707/612 |
| 2010/0114831 A1* | 5/2010 | Gilbert | G06F 17/30575 707/648 |
| 2010/0191884 A1* | 7/2010 | Holenstein | G06F 11/2094 710/200 |
| 2010/0287553 A1* | 11/2010 | Schmidt | G06F 9/4818 718/101 |
| 2012/0095968 A1* | 4/2012 | Gold | G06F 11/1456 707/652 |

(Continued)

*Primary Examiner* — Alicia M Willoughby (57) ABSTRACT

Database performance may be improved by creating additional backups from an existing backup, rather than the original database or audit log source. A second backup may be created from a first backup by copying the files from the first backup to the second backup. The replication from a first backup to a second backup with modification of the file history information allows identical backups to exist on different types of storage devices, including virtual storage devices. Continue functionality may be implemented during a move function to restart replication at a new starting point while retaining the existing move set. Tape-type-override functionality may be implemented during the replication to replace the tape type for the backups with another compatible type while retaining the original type for history file entries, tape trailers, and messages.

16 Claims, 9 Drawing Sheets

(56) References Cited

U.S. PATENT DOCUMENTS

| | | | |
|---|---|---|---|
| 2013/0246700 A1* | 9/2013 | Sorenson | G06F 11/1456 711/111 |
| 2015/0213099 A1* | 7/2015 | Rinke | G06F 17/30575 707/634 |
| 2015/0269237 A1* | 9/2015 | Ries | G06F 11/1412 707/654 |
| 2016/0124814 A1* | 5/2016 | Joseph | G06F 3/067 714/19 |
| 2018/0074914 A1* | 3/2018 | Gokhale | G06F 17/30289 |

* cited by examiner

DATABASE REPLICATION WITH CONTINUE AND TAPE-TYPE-OVERRIDE FUNCTIONS

The instant disclosure relates to databases. More specifically, this disclosure relates to backing up databases and audit logs and performing continue and tape-override functions.

BACKGROUND

Database systems store large amounts of user data in a single location in an organized structure to allow rapid access. In particular, databases store user data from several users in a single system, which is accessed by all users. The number of users accessing a database may include tens, hundreds, or thousands of users. Thus, some database systems are continuously reading and writing user data.

Backups of the database system are critical to ensuring the safety of the user data stored thereon. Performing a backup may require a pause in availability of the database system to allow a snapshot to be created and copied to another storage device. Although the user data copied to the backup is identical to the user data stored in the database system, control data associated with the database system may be altered or dropped during creation of the backup. Further, additional control data may be written to the backup not contained in the database system.

Figure 1:
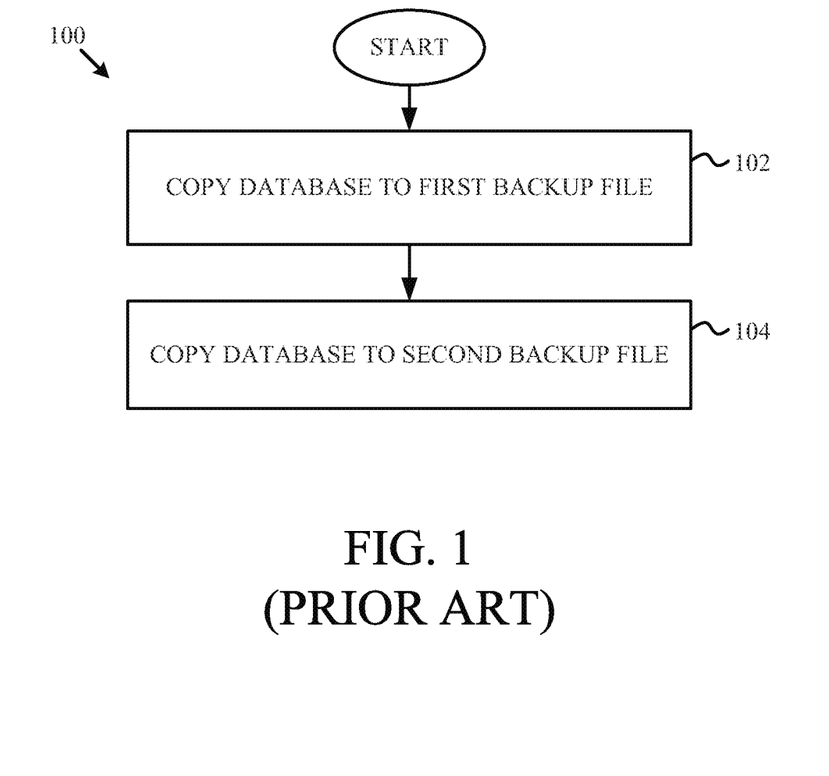
FIG. 1 is a flow chart illustrating a conventional method for creating multiple backups from a database.

Thus, each backup created from the database system uses different control data, which must be independently created during a backup process. Multiple backups may be created from the database system to decrease the likelihood of loss of user data or to create an alternate copy of the database for testing, evaluation, or remote backup. However, because the database system may be temporarily unavailable during the creation of a backup, creating multiple backups may prolong the unavailability of the database system. FIG. 1 is a flow chart illustrating a conventional method for creating multiple backups from a database. A method 100 begins at block 102 with copying a database to a first backup file. The method 100 continues to block 104 with copying a database or an audit log to a second backup file. During copying at block 102 and block 104 the database system may be unavailable. In the case of an audit backup, the original data may no longer be available or a delay in deleting archived logs could cause database or system availability issues.

In conventional systems, a basic replicate move feature may have no way to continue replication for a set if something happened with the original move history or move tapes. An integrated recovery utility (IRU) may enforce retention of a contiguous audit trail in each set by controlling a start point. If a problem is encountered in the original move set, the IRU may require deletion of any alternate move sets and starting over to continue creating replicated move tapes. However, sites might want to retain the existing information in a move set while starting over after an issue.

In addition, a configuration parameter TAPE-TYPE-OVERRIDE may be used to replace the tape type specified in syntax or found in a history file or tape trailer with another compatible type. The original type may be retained for history file entries, tape trailers, and messages. This may allow users to replace obsolete drives with compatible drives having different identifiers. It may also enable absolute device or control unit assignment (something that is not supported in TYPE clause syntax).

Some sites may reserve drives for IRU backups and may need to access those drives using absolute or control unit assignment. Since the syntax does not support specifying absolute device names in the TYPE clause, TAPE-TYPE-OVERRIDE is a recommended mechanism to direct IRU tape processing to these devices.

An existing form of TAPE-TYPE-OVERRIDE may work well for most commands (which use a single tape at a time). However, it may not work well for commands that use multiple reels at the same time: B-option DUMP, DUMP CHANGES, or MOVE commands and REPLICATE commands.

An improvement is needed in the use of TAPE-TYPE-OVERRIDE in the REPLICATE command. This parameter may currently be applied to both the source and destination, which may not be the desired effect. It may not work at all for absolute devices (both tapes cannot be using the same drive), and might not work for control unit or general cases if the replication is to occur to a different drive type than the original backup.

SUMMARY

According to one embodiment, a method includes receiving a user command for a data replication, and implementing a continue method. The continue method further includes determining the existence of a replication problem, stopping the replication, retaining an existing audit backup and history information, marking a restart, restarting the replication from a new point, and creating a new audit backup including the restart mark. The tape-type-override method further includes receiving a tape override command, determining whether the tape override command is a single or double override command, determining whether the override command is proper, and performing an override based on the tape override command.

The method further includes where the tape override command is one of a read command (such as a read override), a write command (such as a write override), and a read/write command (such as a read/write override). The method further includes where determining whether the override command is proper comprises determining that the command contains an override restriction and alerting a user of the override restriction. The method further includes where the read/write command is performed when the first override command is a double override. The method further includes where in subsequent commands that require tape access, if the command reads tapes and the previous tape type override was read or read/write, the tape type identification is replaced with the read override; and if the command writes tapes and the previous tape type override was write or read/write, the tape type identification is replaced with the write override.

According to another embodiment, a computer program product includes a non-transitory computer readable medium having code to receive a user command for a data replication; and code to implement a continue method. The medium also includes code to implement the continue method comprising code to determine the existence of a replication problem; code to stop the replication: code to retain an existing audit backup and history information; code to mark a restart; code to restart the replication from a new point; and code to create a new audit backup including the restart mark. The medium also includes the code to implement the tape-type-override method comprising code to receive a tape override command; code to determine whether the tape override command is a single or double override command; code to determine whether the override command is proper; and code to perform an override based on the tape override command.

The medium further includes where the tape override command is one of a read command (such as a read override), a write command (such as a write override), and a read/write command (such as a read/write override). The medium further includes where determining whether the override command is proper comprises determining that the command contains an override restriction and alerting a user of the override restriction. The medium further includes where the read/write command is performed when the first override command is a double override. The medium further includes where in subsequent commands that require tape access, if the command reads tapes and the previous tape type override was read or read/write, the tape type identification is replaced with the read override; and if the command writes tapes and the previous tape type override was write or read/write, the tape type identification is replaced with the write override.

According to a further embodiment, an apparatus includes a memory for storing a database and includes a processor coupled to the memory. The processor is configured to receive a user command for a data replication; and to implement a continue method. The processor is further configured, when implementing the continue method, to determine the existence of a replication problem; to stop the replication; to retain an existing audit backup and history information; to mark a restart; to restart the replication from a new point; and to create a new audit backup including the restart mark. The processor is further configured, when implementing the tape-type-override method, to receive a tape override command; to determine whether the tape override command is a single or double override command; to determine whether the override command is proper; and to perform an override based on the tape override command.

The apparatus further includes where the tape override command is one of a read command (such as a read override), a write command (such as a write override), and a read/write command (such as a read/write override). The apparatus further includes where determining whether the override command is proper comprises determining that the command contains an override restriction and alerting a user of the override restriction. The apparatus further includes where the read/write command is performed when the first override command is a double override. The apparatus further includes where in subsequent commands that require tape access, if the command reads tapes and the previous tape type override was read or read/write, the tape type identification is replaced with the read override; and if the command writes tapes and the previous tape type override was write or read/write, the tape type identification is replaced with the write override.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Additional backups of a database may be created without further interrupting operation of the database by replicating data from a first backup to a second backup. During the replication process, a first audit backup is created with the first backup having file history information, such as the location of certain data within the first backup, and may be used to create a second audit backup to correspond to the second backup. The first and second audit backup are described in more detail below. The file history information may be modified in the second backup to reflect, for example, the different location of data within the second backup. For example, the first set may be modified to create the second set by changing the links for identifying the location of data within the first backup to identify the location of data within the second backup.

Figure 2:
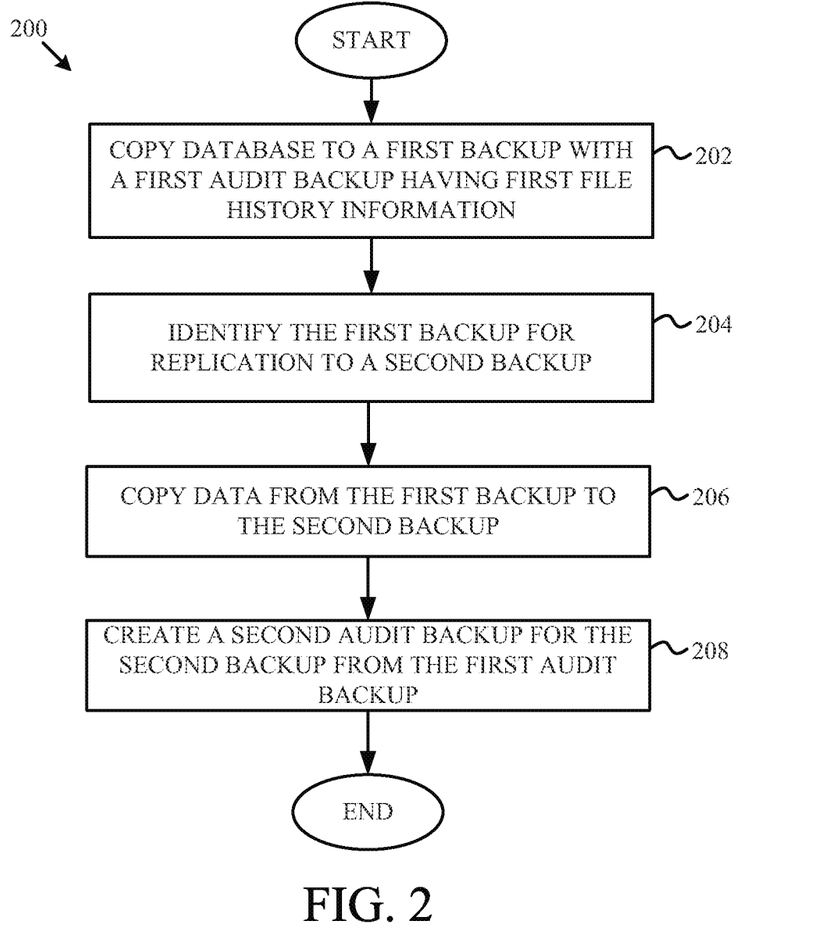
FIG. 2 is a flow chart illustrating an exemplary method for creating a second backup from a first backup according to one embodiment of the disclosure.

FIG. 2 is a flow chart illustrating an exemplary method for creating a second backup from a first backup according to one embodiment of the disclosure. A method 200 begins at block 202 with copying a database or audit log to a first backup with a first audit backup having first file history information. The history information may include, for example, tape identifiers of the tapes on which backups are stored, time stamps of the backups, and ranges of audit records stored on respective tapes. The first audit backup may also include multiple instances of file history content. For example, tracking the backup of multiple files and multiple backups of the same file or set of files may be performed.

Figure 3:
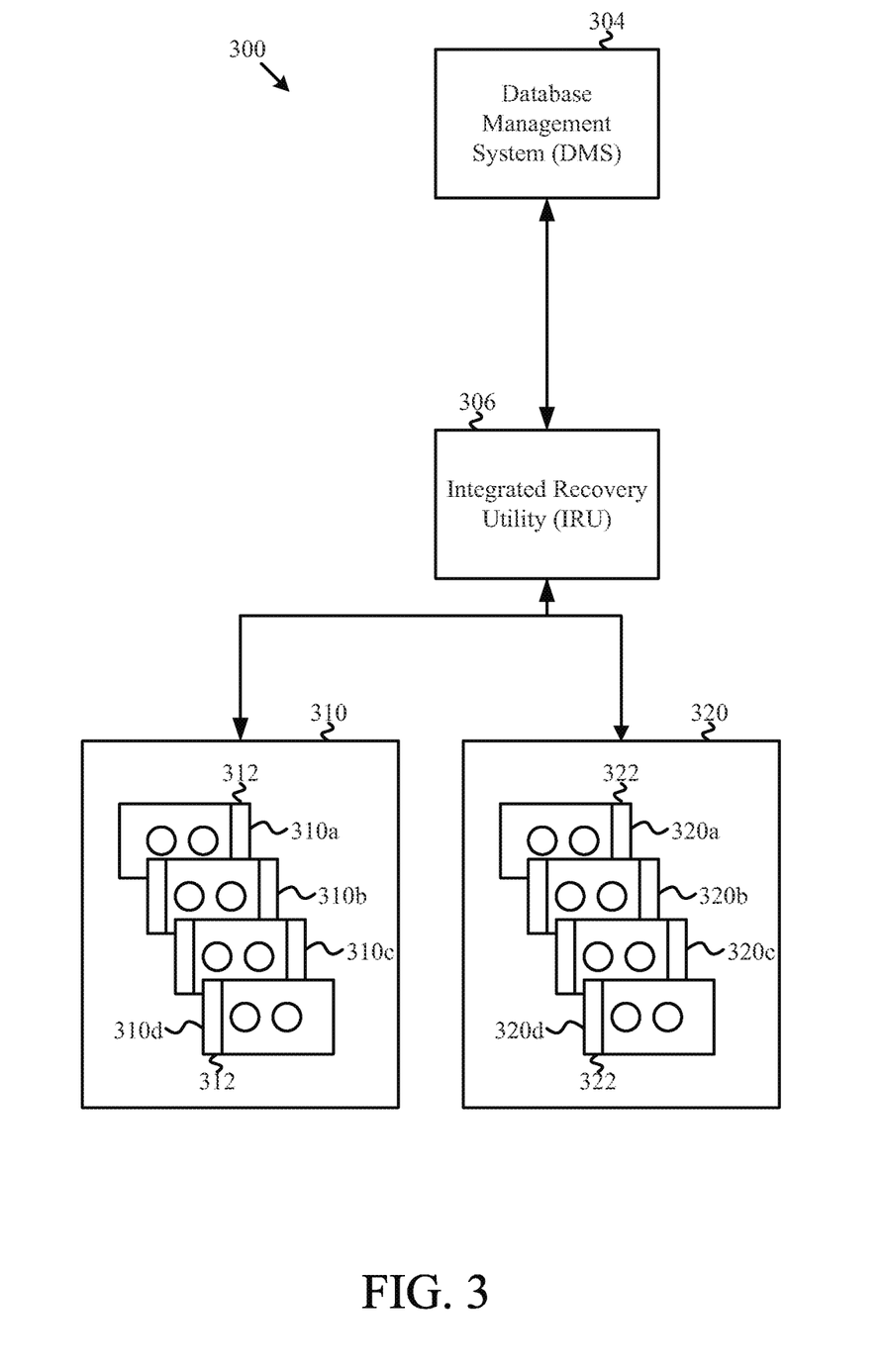
FIG. 3 is a block diagram illustrating a backup system for a database system according to one embodiment of the disclosure.

FIG. 3 is a block diagram illustrating a backup system for a database system according to one embodiment of the disclosure. A database management system (DMS) 304, such as a relational DMS (RDMS), may be coupled to an integrated recovery utility (IRU) 306 for performing backups and/or recovery of a database file in the DMS 304.

Referring back to FIG. 2 at block 204, the first backup is identified for replication to a second backup. The first backup may be identified during the issuance of a replicate command. For example, the IRU 306 of FIG. 3 may receive a replicate command issued by the user. The replicate command initiates a process of copying a backup from a first storage device to a second storage device, whether the storage devices are physical or virtual. According to one embodiment, data may be copied or moved from a first storage device type that is being phased out to a second storage device type.

The replicate command issued to the IRU 306 may include an instruction regarding which data to retain in the copy from the first backup to the second backup. For example, the second backup may retain all data stored in the first backup. The first backup may include multiple files and/or multiple backups of a file. All data may be copied to the second backup or selective portions may be copied to the second backup.

At block 206, data is copied from the first backup to the second backup, and at block 208, the second audit backup is created for the second backup. The second audit backup may be created at block 208 by copying information from the first audit backup, such as start and end timestamps, and adding link and location information corresponding to the location of data in the second backup. Blocks 206 and 208 may operate in parallel, such that the second audit backup is created while the second backup is populated with data from the first backup. For example, after each file is copied to the second backup the location of each file may be added to the second audit backup along with the start and end timestamp for the file from the first audit backup.

The IRU 306 of FIG. 3 may have access to a first backup 310 and a second backup 320. The first backup 310 may include a number of drives 310a-d, such as tapes, that store a backup of the DMS 304, including a database or an audit trail. Data stored on the drives 310a-d include a default audit backup 312 having history information for the first backup 310. The history information may include, for example, links between the drives 310a-d identifying the start and end of files. Although the default audit backup 312 is illustrated as stored across the drives 310a-d, the default audit backup 312 may be stored on only one or a few of the drives 310a-d or may be stored on a separate storage device (not shown). According to one embodiment, the default audit backup 312 may be stored in memory within the IRU 306.

The second backup 320 may include a number of drives 320a-d, which may or may not be identically-configured storage devices to the drives 310a-d of the first backup 310. The second backup 320 may be located remote to the first backup 310. Thus, the second backup 320 may provide an off-site backup to decrease the likelihood that both the first backup 310 and the second backup 320 are lost simultaneously. The second backup 320 may include an alternate audit backup 322 stored on the drives 320a-d having history information for the second backup 320. Because the drives 320a-d may be different than the drives 310a-d, the alternate audit backup 322 may be different from the default audit backup 312. For example, when the drives 320a-d have different storage capacities than the drives 310a-d, the links for files stored on the drives 320a-d contained in the alternate audit backup 322 may link to different locations within the drives 320a-d than contained in the default audit backup 312.

Figure 4:
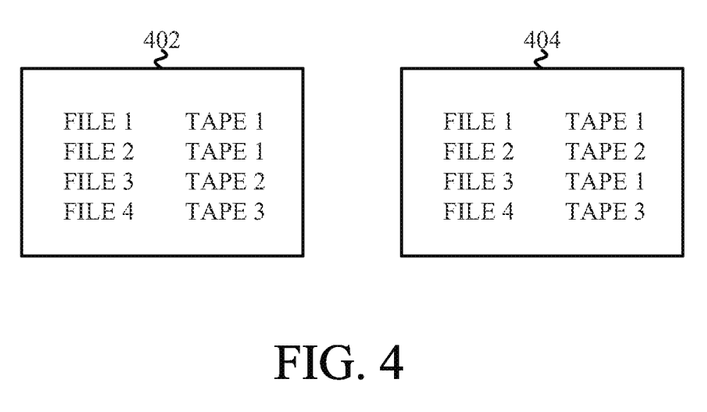
FIG. 4 is a block diagram illustrating two sets corresponding to two backups according to one embodiment of the disclosure.

FIG. 4 is a block diagram illustrating two sets of audit backups corresponding to two backups according to one embodiment of the disclosure. A first set 402 may include a table identifying the location of each file within the first backup. For example, FILE1 may be located on TAPE1, FILE2 may be located on TAPE 1, FILE 3 may be located on TAPE2, and FILE4 may be located on TAPE3. A second set 404 may include a table identifying the location of each of the same files within the second backup. For example, FILE1 may be located on TAPE1, FILE2 may instead be located on TAPE2, FILE3 may instead be located on TAPE1, and FILE4 may be located on TAPE3. Although not shown, the first set 402 and the second set 404 may include additional information, such as time stamps of each of the files backed up.

Figure 5:
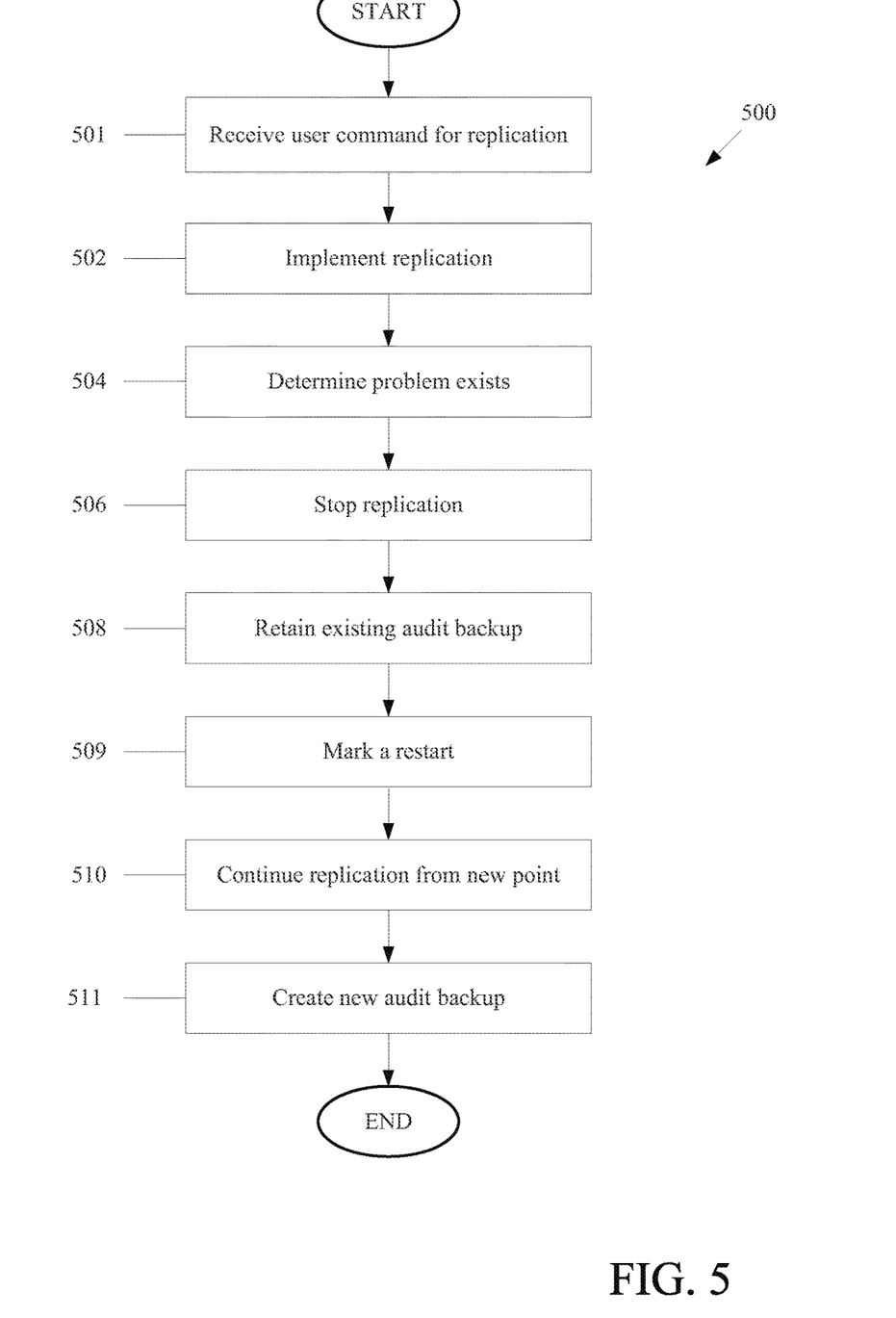
FIG. 5 is a flow chart illustrating an exemplary method for performing a Continue operation according to one embodiment of the disclosure.

In some embodiments, certain functions are useful during the replication process. Two exemplary functions may include a Continue operation and a Tape-Type-Override function. FIG. 5 is a flow chart illustrating an exemplary method for performing a Continue operation according to one embodiment of the disclosure. The Continue feature may provide a mechanism to restart replication in a move set. A method 500 may begin at block 501 by receiving one or more user commands for replication. At block 502, a continue method is implemented by beginning a replication process. This may involve copying an audit log to a backup with an audit backup having file history information. At block 504, the IRU 306 may determine that a problem has occurred in the audit backup. This may be an error with the file history information or the backup tape itself. At block 506, the IRU 306 may stop the replication process due to the found errors. At block 508, the IRU 306 may retain the existing information of the incomplete audit backup. The IRU 306 may control retention of a contiguous audit trail for a move set by controlling the start point. The audit trail of the incomplete audit backup may be analyzed to determine the cause and type of the found errors. At block 509, a restart is marked. At block 510, the IRU 306 may continue the replication from a new starting point to create a new audit backup, including the restart. At block 511, a new audit backup is created. Syntax may be provided to signify a request to keep the existing move set information and continue the replication process from a new starting point. In some embodiments, the restart point is after the existing replication end point. In some embodiments, the syntax may comprise an optional word CONTINUE before a FROM clause to mark a hole and restart from a new point.

Figure 6:
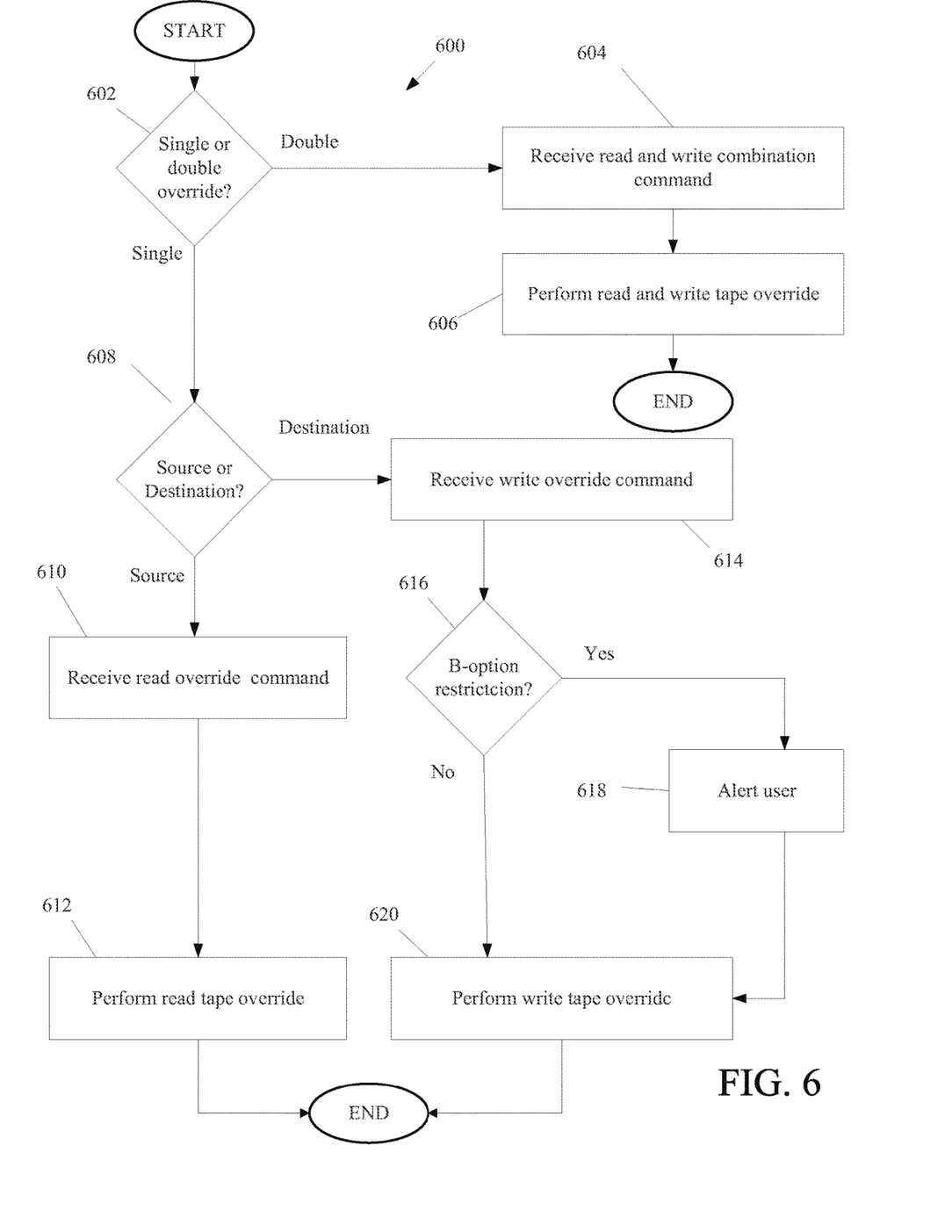
FIG. 6 is a flow chart illustrating an exemplary method for performing a Tape-Override operation according to one embodiment of the disclosure.

FIG. 6 is a flow chart illustrating an exemplary method for performing a Tape-Type-Override operation according to one embodiment of the disclosure. To make replication work well, there must be a way to determine if the override should be applied to the source or the destination. There could also be cases where users might want an override applied to both. The Tape-Type-Override operation allows for the replacement of a tape type identifier specified in syntax, found in a history file or tape trailer with another compatible tape type identifier. A method 600 may begin at step 602 with a user deciding whether to implement a single or double override function. By single override it is meant either a source or a destination override. By double override it is meant both a source and a destination override. This is based on whether the user wants the tape-type-override to be applied to the source, the destination, or both. In some cases, the user may only want to apply override to the source or destination. In this case, the user chooses single override and proceeds to step 608. In some embodiments, a user may use configuration parameter TAPE-TYPE-OVERRIDE-R for read assignments and TAPE-TYPE-OVERRIDE-W for write assignments. If the user wants to override both the source and destination, the user chooses double override and proceeds to block 604. In some embodiments, a user may use configuration parameter TAPE-TYPE-OVERRIDE for this double functionality.

If the user chooses double override at step 602, at block 604, the IRU 306 may receive a read and write combination command from the user. In some embodiments, this may be a configuration parameter TAPE-TYPE-OVERRIDE-W. The IRU 306 may set parameters TAPE-TYPE-OVERRIDE-R and TAPE-TYPE-OVERRIDE-W to the value specified by the user. This may provide compatibility with previously established run streams as well as a shorthand method to set the read and write override values. At block 606, the IRU 306 may perform the read and write tape override consistent with the values specified by the user.

If the user chooses single override at step 602, the method proceeds to step 608. At step 608, the user decides whether to apply the override to a source or a destination. If the user chooses a source override, at block 610, the IRU 306 may receive a read override command from the user. In some embodiments, this may be configuration parameter TAPE-TYPE-OVERRIDE-R. This parameter may specify a tape device type to be used in all tape read assignment statements in place of an otherwise specified or presumed value. By entering a value other than a default value (sometimes denoted by parameter $DEFAULT), the user may indicate a desire to override the presumed or specified value. Entering a value with a leading asterisk (*VALUE) may indicate a desire to use an absolute device assignment. An EXEC assign statement may support both absolute device and control unit specifications while an IRU TYPE clause may not. In some embodiments, the user may use one or more of these parameters to specify an absolute device or control unit for override. At block 612, the IRU 306 may perform the read tape override consistent with the values specified by the user.

If the user chooses a destination override, at block 614, the IRU 306 may receive a write command from the user. In some embodiments, this may be configuration parameter TAPE-TYPE-OVERRIDE-W. This parameter may specify a tape device type to be used in all tape write assignment statements in place of an otherwise specified or presumed value. Similar to read command discussed above, the user may indicate a desire to override the presumed or specified value by entering a value other than a default value. The user may indicate a desire to use an absolute device assignment by entering a value with a leading asterisk. In some embodiments, the user may use one or more of these parameters to specify an absolute device or control unit for override.

It is noted that the decision tree can be altered. For example, the system may simply include three commands: TYPE-OVERRIDE-R; TAPE-TYPE-OVERRIDE-W; and TAPE-TYPE-OVERRIDE-W. Depending on the command received, the system know whether it is a source override, destination override, or both.

At step 616, the IRU 306 may determine whether there is a B-option restriction. In some embodiments, the user may specify a blocking factor for a backup. The blocking factor is number of blocks needed to store the entire record. However, this may cause a problem for absolute device assignments. In some cases, a single drive may not be used for both the main and premount tapes. If the user specifies an absolute device when using a B-option to premount tapes, the IRU 306 may attempt to assign two tapes to the same device. Similarly, in some cases, the user may specify a control unit when using a B-option as long as the control unit supports multiple drives. In some cases, control units may not be used if the control unit does not have enough drives to store all the tapes. When these issues occur, it may be documented as a restriction. In some embodiments, the B-option enables tape premount to improve performance (it eliminates the need to wait for the subsequent tape mounts when multiple tapes are required). Pre-mount to an absolute device causes problems because you can't mount multiple tapes on a single device.

At block 618, the IRU 306 may alert the user to the potential issues discussed above if it determines that there is a B-option restriction. For example, the IRU 306 may warn the user setting a write override to a * value when the B option has been specified. Because the *value denotes an absolute device assignment, the IRU 306 may send one or more messages to alert the user that this may cause problems as multiple tapes cannot be assigned to the same absolute device. The user could then abort the process.

In some embodiments, the configuration parameters only affect the tape assignment. The IRU 306 may use the device specified by the TYPE clause for messages, history file entries, and tape headers and trailers. In some embodiments, the IRU 306 does not check whether the device is suitable for the tape assignment. Therefore, the user may responsible for ensuring that the TYPE is compatible with the specified override value. In troublesome areas such as the B-option discussed above, the alert issued to the user by the IRU 306 at block 618 may help the user avoid problematic assignments. In cases where there is no B-option restriction or cases where the user has been alerted to the presence of a B-option restriction, at block 620, the IRU 306 may perform the write tape override consistent with the values specified by the user.

Figure 7:
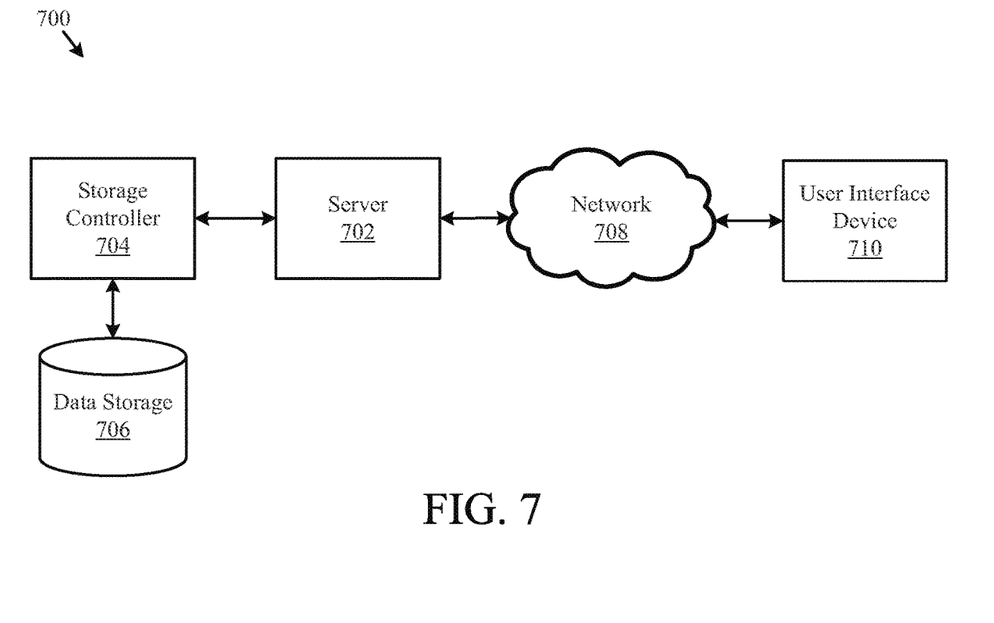
FIG. 7 is block diagram illustrating a computer network according to one embodiment of the disclosure.

FIG. 7 illustrates one embodiment of a system 700 for an information system, such as a system for backing up databases. The system 700 may include a server 702, a data storage device 706, a network 708, and a user interface device 710. The server 702 may be a dedicated server or one server in a cloud computing system. In a further embodiment, the system 700 may include a storage controller 704, or storage server configured to manage data communications between the data storage device 706 and the server 702 or other components in communication with the network 708. In an alternative embodiment, the storage controller 704 may be coupled to the network 708.

In one embodiment, the user interface device 710 is referred to broadly and is intended to encompass a suitable processor-based device such as a desktop computer, a laptop computer, a personal digital assistant (PDA) or tablet computer, a smartphone or other a mobile communication device having access to the network 708. When the device 710 is a mobile device, sensors (not shown), such as a camera or accelerometer, may be embedded in the device 710. When the device 710 is a desktop computer the sensors may be embedded in an attachment (not shown) to the device 710. In a further embodiment, the user interface device 710 may access the Internet or other wide area or local area network to access a web application or web service hosted by the server 702 and provide a user interface for enabling a user to enter or receive information.

The network 708 may facilitate communications of data, such as authentication information, between the server 702 and the user interface device 710. The network 708 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 710 accesses the server 702 through an intermediate sever (not shown). For example, in a cloud application the user interface device 710 may access an application server. The application server fulfills requests from the user interface device 710 by accessing a database management system (DBMS). In this embodiment, the user interface device 710 may be a computer or phone executing a Java application making requests to a JBOSS server executing on a Linux server, which fulfills the requests by accessing a relational database management system (RDMS) on a mainframe server.

Figure 8:
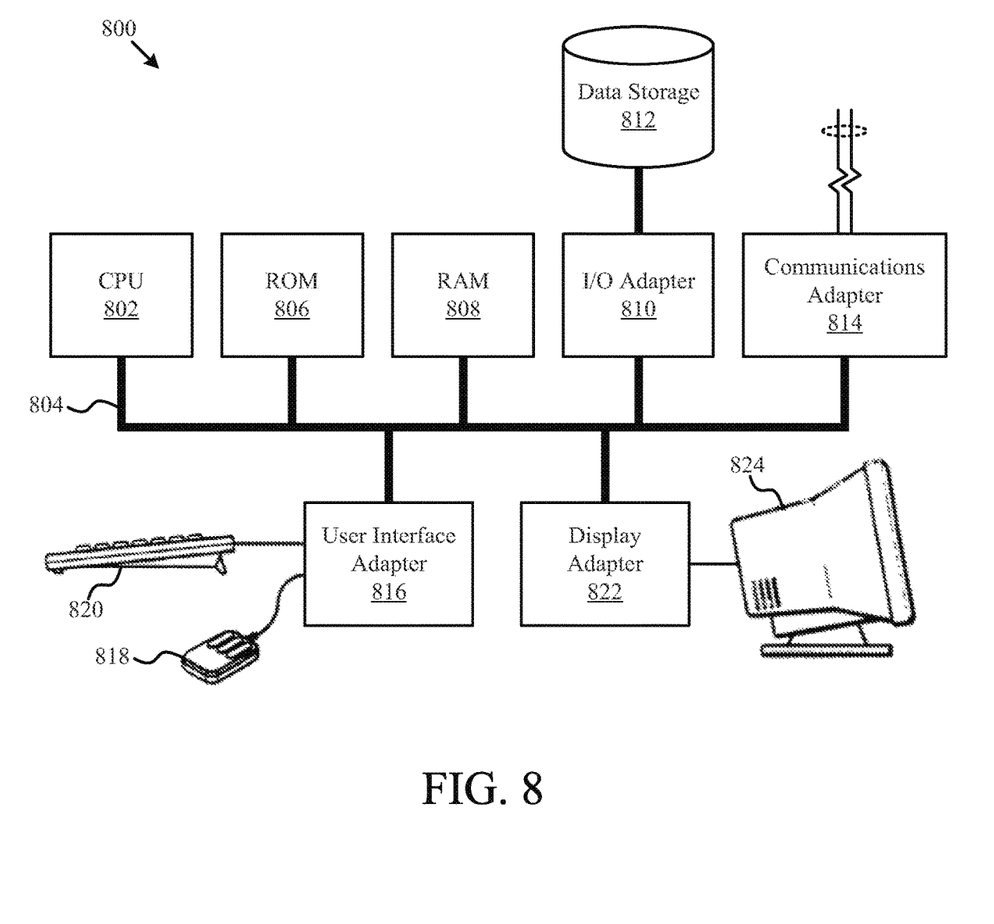
FIG. 8 is a block diagram illustrating a computer system according to one embodiment of the disclosure.

FIG. 8 illustrates a computer system 800 adapted according to certain embodiments of the server 702 and/or the user interface device 710. The central processing unit ("CPU") 802 is coupled to the system bus 804. The CPU 802 may be a general purpose CPU or microprocessor, graphics processing unit ("GPU"), and/or microcontroller. The present embodiments are not restricted by the architecture of the CPU 802 so long as the CPU 802, whether directly or indirectly, supports the operations as described herein. The CPU 802 may execute the various logical instructions according to the present embodiments.

The computer system 800 also may include random access memory (RAM) 808, which may be synchronous RAM (SRAM), dynamic RAM (DRAM), synchronous dynamic RAM (SDRAM), or the like. The computer system 800 may utilize RAM 808 to store the various data structures used by a software application. The computer system 800 may also include read only memory (ROM) 806 which may be PROM, EPROM, EEPROM, optical storage, or the like. The ROM may store configuration information for booting the computer system 800. The RAM 808 and the ROM 806 hold user and system data.

The computer system 800 may also include an input/output (I/O) adapter 810, a communications adapter 814, a user interface adapter 816, and a display adapter 822. The I/O adapter 810 and/or the user interface adapter 816 may, in certain embodiments, enable a user to interact with the computer system 800. In a further embodiment, the display adapter 822 may display a graphical user interface (GUI) associated with a software or web-based application on a display device 824, such as a monitor or touch screen.

The I/O adapter 810 may couple one or more storage devices 812, such as one or more of a hard drive, a solid state storage device, a flash drive, a compact disc (CD) drive, a floppy disk drive, and a tape drive, to the computer system 800. According to one embodiment, the data storage 812 may be a separate server coupled to the computer system 800 through a network connection to the I/O adapter 810. The communications adapter 814 may be adapted to couple the computer system 800 to the network 708, which may be one or more of a LAN, WAN, and/or the Internet. The communications adapter 814 may also be adapted to couple the computer system 800 to other networks such as a global positioning system (GPS) or a Bluetooth network. The user interface adapter 816 couples user input devices, such as a keyboard 820, a pointing device 818, and/or a touch screen (not shown) to the computer system 800. The keyboard 820 may be an on-screen keyboard displayed on a touch panel. Additional devices (not shown) such as a camera, microphone, video camera, accelerometer, compass, and or gyroscope may be coupled to the user interface adapter 816. The display adapter 822 may be driven by the CPU 802 to control the display on the display device 824. Any of the devices 802-822 may be physical, logical, or conceptual.

The applications of the present disclosure are not limited to the architecture of computer system 800. Rather the computer system 800 is provided as an example of one type of computing device that may be adapted to perform the functions of a server 702 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 600 may be virtualized for access by multiple users and/or applications.

Figure 9A:
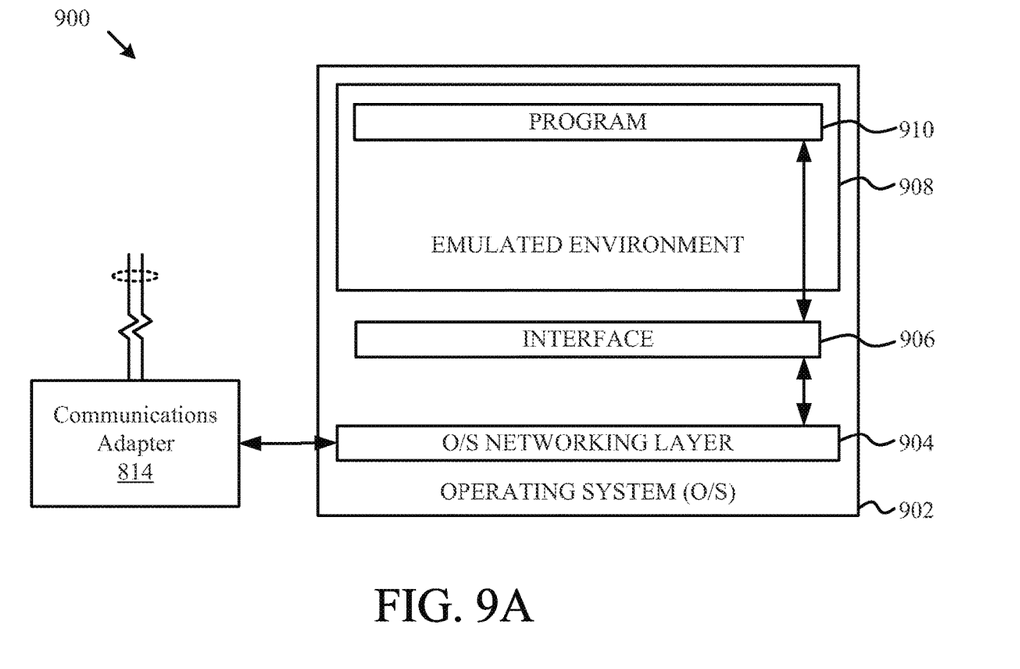
FIG. 9A is a block diagram illustrating a server hosting an emulated software environment for virtualization according to one embodiment of the disclosure.

FIG. 9A is a block diagram illustrating a server hosting an emulated software environment for virtualization according to one embodiment of the disclosure. An operating system 902 executing on a server includes drivers for accessing hardware components, such as a networking layer 904 for accessing the communications adapter 814. The operating system 902 may be, for example, Linux. An emulated environment 908 in the operating system 902 executes a program 910, such as CPCommOS. The program 910 accesses the networking layer 904 of the operating system 902 through a non-emulated interface 906, such as XNIOP. The non-emulated interface 906 translates requests from the program 910 executing in the emulated environment 908 for the networking layer 904 of the operating system 902.

Figure 9B:
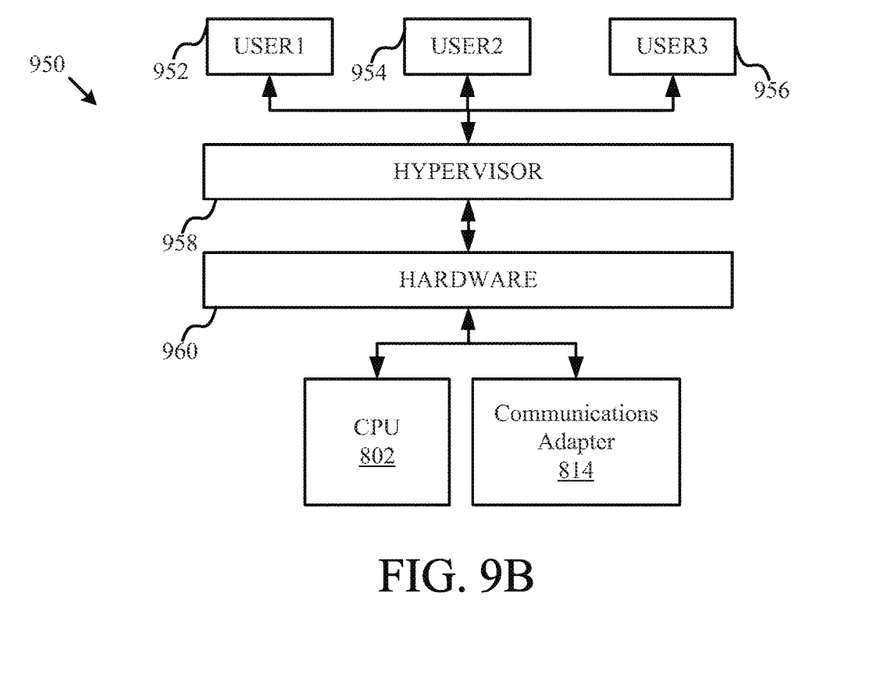
FIG. 9B is a block diagram illustrating a server hosing an emulated hardware environment according to one embodiment of the disclosure.

In another example, hardware in a computer system may be virtualized through a hypervisor. FIG. 9B is a block diagram illustrating a server hosing an emulated hardware environment according to one embodiment of the disclosure. Users 952, 954, 956 may access the hardware 960 through a hypervisor 958. The hypervisor 958 may be integrated with the hardware 960 to provide virtualization of the hardware 960 without an operating system, such as in the configuration illustrated in FIG. 9A. The hypervisor 958 may provide access to the hardware 960, including the CPU 802 and the communications adaptor 814.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   backing up data to form a first backup;
   creating a first audit backup having first file history information for the first backup, the first file history information being based, at least in part, on respective locations of data in the first backup;
   receiving a user command for a data replication of the first backup to form a second backup;
   replicating the first backup to form the second backup, wherein the replication starts at an initial point;
   creating a second audit backup having second file history information for the second backup, starting at an initial point, the second file history information being based, at least in part, on respective locations of replicated data in the second backup;
   implementing a continue method, the continue method further including:
   determining the existence of a replication problem;
   stopping the replication of the first backup;
   retaining an existing portion of the second audit backup when replication is stopped;
   marking a restart mark in the existing portion of the second audit backup;
   restarting the replication of the first backup from a new starting point; and
   creating a new audit backup having new file history information based, at least in part, on respective locations of replicated data in the second backup after restart of the replication, the new audit backup starting from the new starting point, wherein the new starting point corresponds to a location in the existing portion of the second audit backup prior to the restart mark such that the new audit backup includes the restart mark; and
   implementing a tape-type-override method, the tape-type-override method comprising:
   receiving a tape override command; determining whether the tape override command is a single or double override command;
   determining whether the tape override command is proper; and
   performing a tape override based on the tape override command.

2. The method of claim 1, where the tape override command is one of a read command, a write command, and a read/write command.

3. The method of claim 1, where determining whether the tape override command is proper comprises: determining that the tape override command contains an override restriction; and alerting a user of the override restriction.

4. The method of claim 2, where the read/write command is performed when t first override command is a double override.

5. The method of claim 2, where, in subsequent commands that require tape access,
   if the command reads tapes and the previous tape-type override was read or read/write, a tape-type identification is replaced with the read override; and
   if the command writes tapes and the previous tape-type override was write or read/write, the tape type identification is replaced with the write override.

6. The method of claim 1, wherein the first audit backup and the second audit backup are different from each other.

7. A computer program product, comprising:
   a non-transitory computer readable medium comprising:
   code to receive a user command for a data replication of a first data backup to form a second data backup, the first data backup being associated with a first audit file having first history information for the first data backup, the first file history information being based, at least in part, on respective locations of data in the first backup;
   code to replicate the first backup to form a second backup, wherein the replication starts at an initial point;
   code to create a second audit backup having second file history information for the first second data backup, the second file history information being based, at least in part, on respective locations of data in the second backup;
   code to implement a continue method, the continue method further including:
   code to determine the existence of a replication problem;
   code to stop the data replication of the first backup;
   code to retain an existing portion of the second audit backup and second file history information when replication is stopped;
   code to mark a restart mark in the existing portion of the second audit backup;
   code to restart the data replication of the first backup file from a new starting point; and
   code to create a new audit backup having new file history information based, at least in part, on respective locations of replicated data in the second backup after restart of the data replication, the new audit backup starting from the new starting point, wherein the new starting point corresponds to a location in the existing portion of the second audit backup prior to the restart mark such that the new audit backup includes the restart mark; and code to implement a tape-type-override method comprising:
code to receive a tape override command;
code to determine whether the tape override command is a single or double override command;
code to determine whether the override command is proper; and
code to perform an override based on the tape override command.

8. The computer program product of claim 7, where the tape override command is one of a read command, a write command, and a read/write command.

9. The computer program product of claim 7, the code to determine whether the override command is proper comprising: code to determine that the command contains an override restriction; and code to alert a user of the override restriction.

10. The computer program product of claim 7, wherein the first audit backup and the second audit backup are different from each other.

11. An apparatus, comprising:
a memory for storing a database; and
a processor coupled to the memory, in which the processor is configured:
to receive a user command for a data replication of a first backup of at least a portion of the database to form a second backup, the first backup being associated with a first audit file having first file history information for the first backup, the first file history information being based, at least in part, on respective locations of data in the first backup;
to replicate the first backup starting at an initial point;
to create a second audit backup having second file history information for the second backup, the second file history information being based, at least in part, on respective locations of replicated data in the second data backup;
to implement a continue method, the processor being further configured: to determine the existence of a replication problem; to stop the data replication of the first backup;
to retain an existing portion of the second audit backup when replication is stopped;
to mark a restart mark in the existing portion of the second audit backup;
to restart the data replication of the first backup from a new starting point; and
to create a new audit backup having new file history information based, at least in part, on respective locations of replicated data in the second backup after restart of the replication, the new audit backup starting from the new starting point, wherein the new starting point corresponds to a location in the existing portion of the second audit backup prior to the restart mark such that the new audit backup includes the restart mark; and
to implement a tape-type-override method by:
receiving a tape override command;
determining whether the tape override command is a single or double override command;
determining whether the tape override command is proper; and
performing an override based on the tape override command.

12. The apparatus of claim 11, where the tape override command is one of a read command, a write command, and a read/write command.

13. The apparatus of claim 11, where determining whether the tape override command is proper comprises: determining that the tape override command contains an override restriction; and alerting a user of the override restriction.

14. The apparatus of claim 12, where the read/write command is performed when the first override command is a double override.

15. The apparatus of claim 12, where, in subsequent commands that require tape access,
if the command reads tapes and the previous tape-type override was read or read/write, a tape-type identification is replaced with the read override; and
if the command writes tapes and the previous tape-type override was write or read/write, the tape type identification is replaced with the write override.

16. The apparatus of claim 11, wherein the first audit backup and the second audit backup are different from each other.

* * * * *